Patented Oct. 4, 1932

1,880,761

UNITED STATES PATENT OFFICE

REINHARD BUCHWALD, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

COLOR LAKE

No Drawing. Application filed August 26, 1931, Serial No. 559,495, and in Germany September 5, 1930.

The present invention relates to improvements in the production of color lakes of dyestuffs of the triarylmethane series with complex inorganic acids.

It has already been proposed to produce color lakes by treating leuco compounds of dyestuffs of the triarylmethane series with complex inorganic acids or their components in the presence of an oxidizing agent.

I have now found that color lakes of leuco compounds are obtained by precipitating a leuco compound of a basic dyestuff of the triarylmethane series, which may also contain acid groups, with a solution of a complex inorganic acid selected from the group consisting of phosphotungstic acid, phosphomolybdic acid and phosphotungsticmolybdic acid in the absence of agents capable of oxidizing leuco compounds of basic dyestuffs to the corresponding dyestuffs. Reduced complex acids may be employed for the precipitation as well as mixtures of the components capable of forming the said inorganic complex acids. During precipitation the solution is kept acid to an extent sufficient to dissolve at least a substantial amount of the leuco compound either by the employment of the complex acids in the free state or in the form of their acid salts, or by the addition of other, preferably strong, acids. Acids which may be used to dissolve the leuco compound comprise, for example, formic acid, oxalic acid, chloroacetic acid or a strong mineral acid, such as hydrochloric acid and sulphuric acid. The resulting color lakes of leuco compounds are then converted into the corresponding color lakes by oxidation either after isolation or immediately in the suspension obtained by the precipitation of the leuco bases with the said complex acids. Suitable oxidizing agents are for example hydrogen peroxide, arsenic acid, ferric oxide hydrate, chloranil, lead dioxide, potassium permanganate and sodium bichromate. The oxidation of the color lakes of the leuco compounds may be carried out at ordinary or elevated temperatures, for example while boiling, and at atmospheric or increased pressure. The oxidation may also be carried out in the presence of one of the substrata usual in the color lake industry, or with an addition of dispersing agents, such as salts of alkylated naphthalenesulphonic acids, sodium cholate and products of the type of Turkey red oils. The color lakes obtained have greater brilliance and fastness to light than the color lakes produced by precipitating the leuco compounds of the dyestuffs with complex acids and simultaneously oxidizing them.

The following examples will further illustrate how the said invention may be carried out in practice, but the invention is not restricted to these examples. The parts are by weight.

Example 1

800 parts of a 10 per cent solution of sodium phosphotungsticmolybdate are added at about 50° C. while stirring well to 500 parts of a 10 per cent hydrochloric acid solution of the leuco compound of methyl green ("Colour Index" No. 684). The color lake of the leuco compound of methyl green and phosphotungsticmolybdic acid is precipitated in the form of a pale grey flocculent precipitate. While stirring well, the resulting precipitate is oxidized by the addition of 12 parts of a 5 per cent solution of potassium permanganate. Finally the mixture is boiled for a short time by passing steam therethrough. The resulting color lake is filtered off, thoroughly washed and worked up in the usual manner.

Example 2

20 parts of a 10 per cent aqueous paste of the color lake of the leuco compound which has been prepared from the leuco base of Rhoduline blue 6G ("Colour Index" No. 658) and sodium phosphotungstate according to Example 1 are thoroughly mixed with a small amount of the sodium salt of diisopropyl naphthalenesulphonic acid to bring the paste into a state of fine dispersion. About 0.5 part of a 5 per cent solution of potassium permanganate and a small amount of hydrochloric acid are added while stirring vigorously, the acid being added in order to render the suspension slightly acid. After stirring for half an hour at room temperature the mixture is boiled for a short time with steam. After filtering the product is washed well and dried.

*Example 3*

100 parts of a 10 per cent aqueous solution of phosphotungsticmolybdic acid sodium salt are added to 100 parts of a 5 per cent solution of diamond green G leuco base ("Colour Index" No. 662) in an excess of acid. The color lake of the leuco compound is precipitated. While stirring well about 1.2 parts of a 5 per cent solution of potassium permanganate are added and vigorous stirring is continued for about 1¼ hours at room temperature. The mixture is finally boiled for a short time by passing steam therethrough. The resulting color lake is filtered off and washed well.

*Example 4*

200 parts of a 10 per cent aqueous solution of the sodium salt of phosphotungsticmolybdic acid to which 0.2 part of diisopropyl-naphthalenesulphonic acid has been added, are added to 220 parts of a 5 per cent solution of the leuco base of Acronol brilliant blue ("Colour Index" No. 664) which has been made slightly acid by the addition of sulphuric acid. The color lake of the said leuco base is thus precipitated. It is then oxidized to the color lake proper by the addition of 25 parts of a 10 per cent solution of sodium bichromate while thoroughly stirring. The whole is then slowly heated to between 90° and 95° C. until the oxidation is complete. The color lake thus obtained is filtered off, thoroughly washed and worked up in the usual manner.

*Example 5*

200 parts of a 2 per cent solution of the leuco base of diamond green G ("Colour Index" No. 662) which has been made slightly acid by means of sulphuric acid, are mixed with 0.2 part of the diisopropyl-naphthalenesulphonic acid, and then 40 parts of a 10 per cent solution of sodium phosphotungsticmolybdate are added. The color lake of the said leuco base is thus precipitated. A well-washed substratum prepared from 20 parts of heavy spar, 10 parts of aluminium sulphate, 5 parts of calcined soda and 12 parts of barium chloride is then added to the reaction mixture. The color lake is then oxidized by the addition of 25 parts of a 5 per cent aqueous solution of potassium permanganate. By the oxidation, the color lake of diamond green G and the said complex inorganic acid is formed. After stirring for about ½ hour the reaction mixture is boiled for some time by passing steam through it and it is then worked up in the usual manner.

What I claim is:

A process of producing color lakes which comprises precipitating a leuco compound of a basic dyestuff of the triarylmethane series with a solution of a complex inorganic acid selected from the group consisting of phosphomolybdic acid, phosphotungstic acid and phosphotungsticmolybdic acid, in the absence of agents capable of oxidizing leuco compounds of basic dyestuffs to the corresponding dyestuffs, while keeping the reaction mixture acid to an extent to dissolve at least a substantial amount of the leuco compound, and then oxidizing the color lake of the leuco compound to the color lake of the corresponding dyestuff.

In testimony whereof I have hereunto set my hand.

REINHARD BUCHWALD.